United States Patent [19]

Krylov et al.

[11] 4,337,679
[45] Jul. 6, 1982

[54] PLATE SHEARS

[76] Inventors: Gleb L. Krylov, prospekt K. Marxa, 20, kv. 93; Ivan V. Stanovoi, ulitsa Privokzalnaya, 29, kv. 8; Georgy P. Fuga, ulitsa Z. Kosmodemyanskoi, 93, kv. 4, all of Azov Rostovskoi oblasti, U.S.S.R.

[21] Appl. No.: 243,908

[22] PCT Filed: Jul. 2, 1979

[86] PCT No.: PCT/SU79/00050
§ 371 Date: Mar. 2, 1981
§ 102(e) Date: Mar. 2, 1981

[87] PCT Pub. No.: WO81/00070
PCT Pub. Date: Jan. 22, 1981

[51] Int. Cl.³ .................... B26D 7/02; B23D 15/06
[52] U.S. Cl. ........................................ 83/385; 83/610
[58] Field of Search ............... 83/385, 386, 387, 389, 83/612, 610, 382, 378, 384, 454

[56] References Cited

U.S. PATENT DOCUMENTS

| 490,777 | 1/1893 | Trethewey | 83/389 |
|---|---|---|---|
| 2,118,278 | 5/1938 | Tucker | 83/386 X |
| 2,509,479 | 5/1950 | Cartlidge | 83/612 X |
| 3,808,930 | 5/1974 | Sieben | 83/389 X |
| 3,898,903 | 8/1975 | Bulka | 83/389 X |

FOREIGN PATENT DOCUMENTS 276214 11/1951 Switzerland .................... 83/610

*Primary Examiner*—Jimmy C. Peters
*Attorney, Agent, or Firm*—Fleit & Jacobson

[57] ABSTRACT

Plate shears comprise a fixed blade (2) secured on a bed (1), and a movable blade (3) fixed in a blade beam (4). The blade beam (4) is mounted for reciprocation in the direction of shearing in guides (7) of a clamping beam (5) which is permitted turning motion and articulated to the bed (1). The blade and clamping beams (4,5) are set in motion by means of a drive connected therewith through a system of levers (8,9).

1 Claim, 1 Drawing Figure

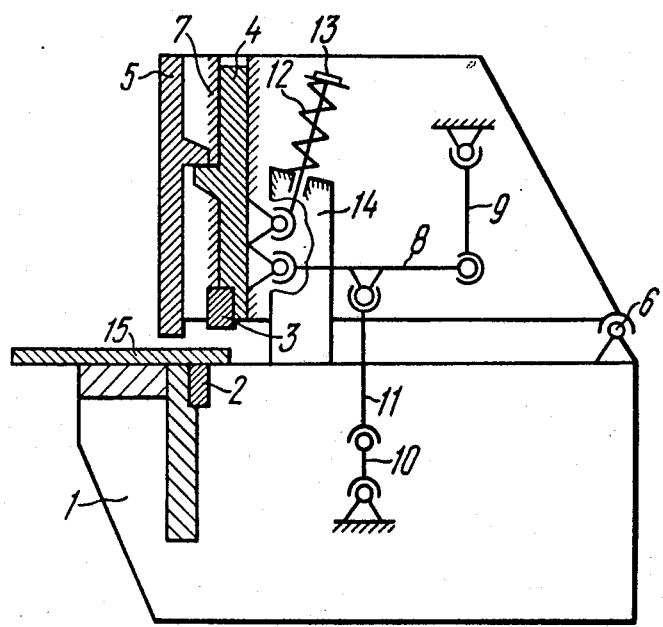

PLATE SHEARS

FIELD OF THE INVENTION

The present invention relates to shearing of metals and more in particular to plate shears.

BACKGROUND OF THE INVENTION

In shearing of plates or sheers the quality of cutting depends on the clearance between the blades, which should be proportional to the thickness of the material being cut, and on the proportionality ranging from 30 to 50 percent of the clamping force acting on the plate under shearing to the shearing force. in addition, the quality of shearing is dependent on the nature of motion, rectilinear or curvilinear, of a movable blade. Preference is given to the rectilinear motion of the movable blade, since it prevents the non-working surface thereof from running against the cutting edge of the fixed blade. In this way it becomes possible to maintain an adequate clearance between the blades throughout the operating cycle.

There ae known shears for plates or sheets (Germany, Federal Republic of, Pat. No. 1,502,879 cl. 31/04, 1970, issued on July 22, 1971, Applicant Maschinenfabric Sack G.m.b.H.), which comprise a bed-mounted fixed blade co-operating with a movable blade rigidly secured on a beam. Mounted in the guides of the bed is a clamping beam pivotally connected to a two-arm lever which, in turn, is articulated to the bed so that one of its arms is connected to the bed through the agency of a hydraulic cylinder and carries a roller interacting with a driven cam, the other arm of the lever co-operating with the clamping beam. Mounted in the clamping beam is a blade beam which is connected to a drive. Though in these shears the inter-blade clearance is set automatically in accordance with the thickness of the material, yet they fail to ensure proportionality in the clamping force acting on the plate or sheet to the shearing force. Moreover, the provision of individual drives for actuating the clamping and blade beams renders there shears more complicated in construction.

There are also known plate shears which comprise a bed-mounted fixed blade co-operating with a movable blade rigidly fixed on a blade beam mounted in clamping beam articulated to the bed, and a drive for actuating the clamping and blade beams. The clamping beam is pivotally connected to the bed with the possibility for turning motion enabling contact with the surface of a sheet or plate subjected to shearing. The beam with the movable blade fixed thereon is pivotally connected to the clamping beam and articulated directly to the drive. The articulations and the pivot are mutually arranged so as to ensure proportionality of the material resistance to shearing. An adequate clearance between the blades in these shears is set automatically in proportion to the thickness of the material being cut, and the power-driven blade beam gives up to the clamping beam the clamping force acting on the plate or sheet, which is proportional to the shearing force. its value is determined on account of the relationship between the application of the arms of force and the reaction to the axis of oscillation of the clamping beam. However, the shears described above permit quality shearing of sheets having only 4 mm in thickness and 3000 mm in width. The shearing of plates with a width of more than 3000 mm is pratically impossible, since during the turning motion of the clamping beam, the non-working surface of the movable blade is run against the cutting edge of the fixed blade and thus precludes the possiblity of maintaining on adequate clearance between the blades in the course of shearing. The under-blade bed at the blade beam, performing turning motion during shearing, is made to conform in shape to quadratic curve, and the blade is mounted on the beam so that when in fixed position its cutting edge also acquires the form of quadratic curve. Treating of such a bed and a long blade is technologically inefficent and requires special equipment.

DISCLOSURE OF THE INVENTION

What is required is the provision of plates shears in which the shearing operation effected by advancing a blade beam would make it possible to handle plates of increased thickness and width, and to improve the quality of shearing while maintaining proportionality of the clamping force acting on a plate or sheet to the shearing force.

Thus the invention provides plate shears comprising a bed-mounted fixed blade co-operating with a movable blade secured on a blade beam which is mounted on a clamping articulated on the bed, and a drive for actuating the clamping and blade beams, wherein the clamping beam is provided with guides for the blade beam to be mounted therein for reciprocation in the shearing direction from a drive and through a system of articulated levers, with one of them being pivotally connected to the blade beam and to drive.

Such shears construction renders them applicable for quality shearing of plates of practically any width and in a wide range of thicknesses. In addition, unlike the shears which are provided with the turning blame beam having the movable double-edge blade, the shears of the invention make it possible to use blades with four cutting edges. The under-blade bed at the blade beam in the proposed shears, in which the blade performs, translatory motion, is flat, technologically efficient and requires no special metal-working equipment for its manufacture.

BRIEF DESCRIPTION OF THE DRAWING

The invention will now be described with reference to the sole accompanying drawing in which there is shown in cross section a kinematic diagram of shears according to the invention.

BEST MODE OF CARRYING OUT THE INVENTION

The plate shears illustrated comprises a bed 1 mounting a fixed blade 2 co-operating with a movable blade 3 which is rigidly fixed, for example, by means of threaded engagement, on a blade beam 4 mounted in a clamping beam 5 which is pivotally connected, such as shown at 6, to the bed 1. The clamping beam 5 is provided with guides 7 for the blade beam 4 to be mounted thereon for reciprocation along the shearing direction from a drive through a system of articulated levers 8 and 9. The drive for actuating the shears is made, for instance, in the form of an eccentric shaft 10 with a connecting rod 11 which is articulated to the lever 8 having one of its ends articulated to the blade beam 4 and the other end thereof to the lever 9. The lever 9 is also articulated to the clamping beam 5. The shears are equipped with a resilient member, for example, a tension spring 12 with a tie rod 13 articulated to the blade beam 4 and mounted on a support structure 14 rigidly connected with the bed 1. The resilient member 12 serves to hold in the uppermost position the blade and clamping beams 4 and 5, and to create prestressing force acting on a plate 15 subjected to shearing.

The plate shears according to the invention operate in the following manner.

Prior to operation, the blade beam 4 and the clamping beam 5 occupy their uppermost positions. In the absence of the plate 15 to be fed for shearing, the initial clearance between the blades 2 and 3 is minimal, for example, 0.02 mm. On energizing an electric motor (not shown) of the shears drive, the eccentric shaft 10 is set in motion and thus enables the connecting roll 11 to act on the system of the levers 8,9 and through them on the blade beam 4 and the clamping beam 5. As a result, the former and the latter are simultaneously about the pivot 6 in the direction of the plate 15 being sheared until the clamping beam 5 is brought in contact with the plate 15. Depending on the thickness of the plate 15, the angular position of the clamping beam 5 is altered relative to the vertical passing through the cutting edge of the fixed blade 2, which determines the direction in which advances the blade beam 4 and the vertical distance between the cutting edges of the blades 2 and 3, which determines the size of clearance between the blades 2 and 3. After the clamping beams has been brought to a halt, the blade beam 4 with the blade 3 starts to advance in the guides 7 of the clamping beam 5, thereby displacing the tie rod 13 and compressing the spring 12, the force of which is used to create the prestressing force acting on the plate 15, which precludes its shear drag when coming in contact with the blade 3. The cutting edge of the blade 3 is displaced rectilinearly and with a uniform clearance relative to the edge of the fixed blade 2, whereby the non-working surface of the blade 3 is prevented from running against the cutting edge of the blade 2. This allows the plates 15 fed for shearing to be selected within a wide range of widths and thicknesses. As the cutting edge of the blade 3 acts on the plate 15, the shearing force is increased along with the force transmitted by the connecting rod 11, which acts through the system of the levers 8 and 9 on the clamping beam 5. The higher the shearing force, the higher is the force of clamping.

Thus the force acting on the plate 15 is proportional to the shearing force and is made up of the prestressing force acting on the plate 15 and brought on by the resilient member 12 which, with the clamping beam brought to a stop, acts as a means for balancing the blade beam 4 and the clamping force developed by the shears drive and transferred onto the clamping beam 5. The clamping force, which is proportional to the shearing force, is determined in accordance with the relationship of the application of the arms of force and the reaction on the clamping beam 5 to the pivot 6.

INDUSTRIAL APPLICABILITY

The shears of the invention may find extensive use in various branches of industry for shearing plates from ferrous and nonferrous metals, and also for shearing plates from non-metallic materials, such as cardboard, paper and textolite.

We claim:

1. Plate shears comprising a bed-mounted fixed blade co-operating with a movable blade secured on a blade beam mounted in a clamping beam articulated to the bed, and a drive for actuating the blade and clamping beams, characterized in that the clamping beam (5) is provided with guides (7) for the blade beam (4) to be mounted therein for reciprocation in the direction of shearing from the drive and through the agency of a system of articulated levers (8,9) with one of these levers being articulated to the blade beam (4) and to the drive.

* * * * *